US011562167B2

(12) United States Patent
Yoon et al.

(10) Patent No.: US 11,562,167 B2
(45) Date of Patent: Jan. 24, 2023

(54) METHOD OF TRAINING NEURAL NETWORK CLASSIFICATION MODEL USING SELECTED DATA

(71) Applicant: MakinaRocks Co., Ltd., Seoul (KR)

(72) Inventors: Andre S. Yoon, Seoul (KR); Sangwoo Shim, Seoul (KR); Yongsub Lim, Gunpo-si (KR); Ki Hyun Kim, Yongin-si (KR); Byungchan Kim, Seoul (KR); JeongWoo Choi, Seoul (KR)

(73) Assignee: MakinaRocks Co., Ltd., Seoul (KR)

( * ) Notice: Subject to any disclaimer, the term of this patent is extended or adjusted under 35 U.S.C. 154(b) by 76 days.

(21) Appl. No.: 16/832,694

(22) Filed: Mar. 27, 2020

(65) Prior Publication Data

US 2020/0320337 A1 Oct. 8, 2020

Related U.S. Application Data

(60) Provisional application No. 62/828,346, filed on Apr. 2, 2019.

(30) Foreign Application Priority Data

Jun. 7, 2019 (KR) ........................ 10-2019-0067175

(51) Int. Cl.
*G06N 3/08* (2006.01)
*G06K 9/62* (2022.01)
(Continued)

(52) U.S. Cl.
CPC ......... *G06K 9/6215* (2013.01); *G06K 9/6228* (2013.01); *G06K 9/6256* (2013.01);
(Continued)

(58) Field of Classification Search
CPC ........... G06K 9/16215; G06K 9/16256; G06K 9/16228; G06K 9/62; G06N 20/00; G06N 3/084; G06N 3/08
See application file for complete search history.

(56) References Cited

U.S. PATENT DOCUMENTS

2003/0061212 A1 3/2003 Smith et al.
2016/0342888 A1 11/2016 Yang et al.
(Continued)

FOREIGN PATENT DOCUMENTS

JP 2018-536923 A 12/2018
KR 1020180055708 A 5/2018
(Continued)

OTHER PUBLICATIONS

Li et al. "A Novel Enhanced Weighted Clustering Algorithm for Mobile Networks", IEEE, 2009, pp. 4.*
(Continued)

*Primary Examiner* — Li Wu Chang
(74) *Attorney, Agent, or Firm* — Knobbe, Martens, Olson & Bear, LLP

(57) ABSTRACT

Disclosed is a non-transitory computer readable medium storing a computer program. When the computer program is executed by one or more processors of a computing device, the computer program performs the following operations for processing data, and the operations may include: determining an uncertainty level with respect to labeling criteria for each of one or more data included in a dataset; determining a similarity level for one or more data included in a data subset; and selecting at least some of data included in the dataset based on the uncertainty level and the similarity level, and additionally labeling the selected data.

13 Claims, 7 Drawing Sheets

(51) Int. Cl.
  *G06N 20/00* (2019.01)
  *G06N 20/10* (2019.01)
(52) U.S. Cl.
  CPC ............ *G06N 3/084* (2013.01); *G06N 20/00* (2019.01); *G06N 20/10* (2019.01)

(56) References Cited

U.S. PATENT DOCUMENTS

| | | | |
|---|---|---|---|
| 2017/0024849 A1 | 1/2017 | Liu et al. | |
| 2019/0034831 A1 | 1/2019 | Perona et al. | |
| 2020/0142930 A1* | 5/2020 | Wang | G06K 9/6223 |
| 2020/0234143 A1 | 7/2020 | Yoon et al. | |
| 2021/0278828 A1* | 9/2021 | Kawano | G05B 19/41875 |

FOREIGN PATENT DOCUMENTS

| | | |
|---|---|---|
| KR | 1020180080482 | 7/2018 |
| KR | 10-1880628 B1 | 8/2018 |
| KR | 10-2101974 B1 | 4/2019 |
| KR | 1020190050477 | 5/2019 |

OTHER PUBLICATIONS

Zhang et al. "Data Cleaning and Classification in the Presence of Label Noise with Class-Specific Autoencoder", Springer International Publishing AG, T. Huang et al. (Eds.): ISNN 2018, pp. 256-26.*

Krishnan et al. "ActiveClean: Interactive Data Cleaning For Statistical Modeling", VLDB, 2016, pp. 948-959.*

Notice of Allowance dated Jul. 26, 2021 in counterpart Korean Application No. 10-2019-0067175.

Office Action dated Feb. 15, 2021 in counterpart Korean Application No. 10-2019-0067175.

Office Action dated Feb. 15, 2021 in Korean Application No. 10-2019-0067175.

Tong et al., "Support Vector Machine Active Learning with Application to Text Classification", Journal of Machine Learning Research, pp. 45-66 (2001).

Woo et al., "An Efficient Active Learning Method Based on Random Sampling and Backward Deletion", LNCS vol. 7751, pp. 683-691 (2013).

* cited by examiner

METHOD OF TRAINING NEURAL NETWORK CLASSIFICATION MODEL USING SELECTED DATA

CROSS-REFERENCE TO RELATED APPLICATIONS

This application claims priority to Korean Patent Application No. 10-2019-0067175, filed on Jun. 7, 2019, and claims the benefit of U.S. Provisional Application No. 62/828,346, filed on Apr. 2, 2019, the contents of which are incorporated herein by reference in their entireties.

BACKGROUND

Technical Field

The present disclosure relates to an artificial intelligence technical field, and more particularly, to training data management.

Description of the Related Art

As sensor data which can be temporarily or permanently stored and used in a database are accumulated, a research is being conducted on automated processing of monitoring data of many industrial equipment. In order to implement a method for determining a state of data, a research on artificial intelligence technology using an artificial neural network is being conducted.

While a deep learning model using the artificial neural network provides a method that can effectively train a complex non-linear or dynamic pattern, when the data to be processed is changed, there exists a technical task of updating models.

Korean Patent Unexamined Publication No. KR10-2018-0055708 discloses an image processing method using artificial intelligence.

SUMMARY

The present disclosure has been made in an effort to provide a method for processing data using artificial intelligence.

An exemplary embodiment of the present disclosure provides a non-transitory computer readable medium storing a computer program. When the computer program is executed by one or more processors of a computing device, the computer program performs the following operations for processing data, and the operations may include: determining an uncertainty level with respect to labeling criteria for each of one or more data included in a dataset; determining a similarity level for one or more data included in a data subset; and selecting at least some of data included in the dataset based on the uncertainty level and the similarity level, and additionally labeling the selected data.

Alternatively, the operations may further include mapping one or more data included in the dataset to solution space by inputting the one or more data included in the dataset to a classification model.

Alternatively, the operations may further include, after the selecting at least some of data included in the dataset based on the uncertainty level and the similarity level and additionally labeling the selected data, updating a classification model based at least in part on the additionally labeled data.

Alternatively, the selecting of at least some of data included in the dataset based on the uncertainty level and the similarity level and the additionally labeling of the selected data may include selectively labeling data having a high uncertainty level and a low similarity level.

Alternatively, the uncertainty level with respect to the labeling criteria for each of the one or more data may be determined based at least in part on a result of classifying each of the one or more data using a classification model.

Alternatively, the operations may further include mapping each of the one or more data to solution space by inputting each of the one or more data to the classification model, and the uncertainty level with respect to the labeling criteria for each of the one or more data may be determined based on a distance between a location in a solution space of each of the one or more data and classification criteria of the classification model.

Alternatively, the operations may further include mapping each of the one or more data to data space, and the uncertainty level with respect to the labeling criteria for each of the one or more data may be determined based on a distance between a location in data space of each of the one or more data and classification criteria.

Alternatively, the operations may further include mapping each of the one or more data included in the data subset to solution space by inputting each of the one or more data included in the data subset to the classification model, and the similarity level for the one or more data included in the data subset may be determined based on a location in the solution space of each of the one or more data.

Alternatively, the operations may further include mapping each of the one or more data included in the data subset to data space, and the similarity level for the one or more data included in the data subset may be determined based on a location in the data space of each of the one or more data.

Alternatively, the data subset may be a unique pair selected from the one or more data included in the dataset.

Alternatively, the selecting of at least some of data included in the dataset based on the uncertainty level and the similarity level and the additionally labeling of the selected data may include selecting at least some of data included in the dataset based on the uncertainty level and the similarity level that have a correlation with one another.

Alternatively, the correlation of the uncertainty level and the similarity level may be determined by calculating relative weights of each of the uncertainty level and the similarity level.

Alternatively, the data may include sensor data collected during manufacturing of a product in a manufacturing environment.

Another exemplary embodiment of the present disclosure provides a method for processing data executed on one or more processors of a computing device. The method may include: determining an uncertainty level with respect to labeling criteria for each of one or more data included in a dataset; determining a similarity level for one or more data included in a data subset; and selecting at least some of data included in the dataset based on the uncertainty level and the similarity level, and additionally labeling the selected data.

Still another exemplary embodiment of the present disclosure provides a computing device for data processing. The computing device may include: one or more processors; and a memory for storing computer programs executable on the one or more processors, in which the one or more processors may be configured to: determine an uncertainty level with respect to labeling criteria for each of one or more data included in a dataset; determine a similarity level for one or more data included in a data subset; and select at least some of data included in the dataset based on the uncertainty level and the similarity level, and additionally label the selected data.

According to an exemplary embodiment of the present disclosure, it is possible to provide a method for processing data using artificial intelligence.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION OF THE PREFERRED EMBODIMENT

Figure 1:
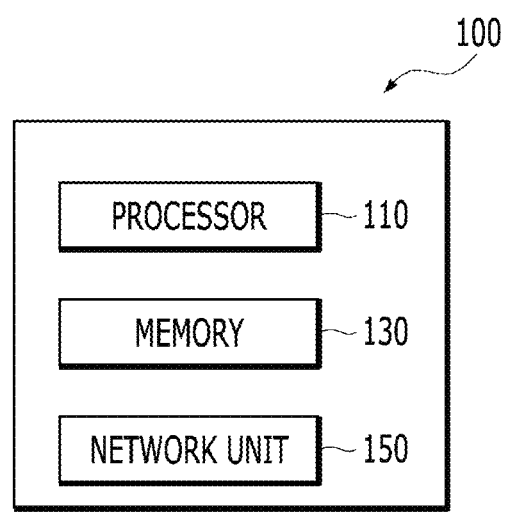
FIG. 1 is a block diagram of a computing device for performing a data processing method according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

The terms "Component", "module", "system", and the like which are used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Furthermore, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not an exclusive "or" but an inclusive "or". That is, when not separately specified or not clear in terms of a context, a sentence "X uses A or B" is intended to mean one of the natural inclusive substitutions. That is, the sentence "X uses A or B" may be applied to all of the cases where X uses A, the case where X uses B, or the case where X uses both A and B. Furthermore, it should be understood that the term "and/or" used in the specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Furthermore, when not separately specified or it is not clear in terms of the context that a singular form is indicated, it should be construed that the singular form generally means "one or more" in the present specification and the claims.

Those skilled in the art need to additionally recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and the network function and a neural network may be interchangeably used.

In the present disclosure, labeling criteria and classification criteria may be interchangeably used.

This specification claims priority to and the benefit of U.S. Provisional Application No. 62/828,346 filed on Apr. 2, 2019, the entire contents of which are incorporated herein by reference.

This specification incorporates by reference the contents in their entireties of Korean Patent Application No. 10-2018-0080482, filed on Jul. 11, 2018, and Korean Patent Application No. 10-2019-0050477, filed on Apr. 30, 2019.

FIG. 1 is a block diagram of a computing device for performing a data processing method according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep training, which include a central processing unit (CPU), a general purpose graphics processing unit (GPGPU), a tensor processing unit (TPU), and the like of the computing device. The processor 110 may read a computer program stored in the memory 130 to perform the data processing method according to an exemplary embodiment of the present disclosure. According to an exemplary embodiment of the present disclosure, the processor 110 may perform an operation for training a neural network model. The processor 110 may perform calculations for training the neural network, which include processing of input data for training in deep training (DN), extracting a feature in the input data, calculating an error, updating a weight of the neural network using back-propagation, and the like. At least one of the CPU, GPGPU, and TPU of the processor 110 may process training of a network function. For example, the CPU and the GPGPU may together process the training of the network function and data classification using the network function. Furthermore, in an exemplary embodiment of the present disclosure, processors of a plurality of computing devices may be used together to process the training of the network function and the data classification using the network function. Furthermore, the computer program executed in the computing device according to an exemplary embodiment of the present disclosure may be a CPU, GPGPU, or TPU executable program.

In an exemplary embodiment of the present disclosure, the computing device 100 may distribute and process a network function by using at least one of the CPU, the GPGPU, and the TPU. Furthermore, in an exemplary embodiment of the present disclosure, the computing device 100 may distribute and process the network function together with other computing devices. A description of detailed contents regarding network function distribution processing of the computing device 100 is specifically discussed in U.S. patent application Ser. No. 15/161,080 (filed on May 20, 2016) and Ser. No. 15/217,475 (filed on Jul. 22, 2016), the contents of which are hereby incorporated by reference in their entireties.

The processor 110 may acquire a dataset including one or more data to be trained. In an exemplary embodiment of the present disclosure, data processed by using a neural network model may include all kinds of data acquired in an industrial field. For example, the data may include operating parameters of a device for producing a product in a production process, sensor data acquired by an operation of the device, and the like. For example, temperature setting of equipment in a specific process, a wavelength of a laser in the case of a process using the laser, and the like may be included in the type of data processed in the present disclosure. For example, the processed data may include lot equipment history data from a management execution system (MES), data from an equipment interface data source, processing tool recipes, processing tool test data, probe test data, electrical test data, combined measurement data, diagnostic data, remote diagnostic data, post-processing data, and the like and the present disclosure is not limited thereto. As a more specific example, the processed data may include work-in-progress information including approximately 120,000 items for each lot acquired in a semiconductor fab, raw processing tool data, equipment interface information, progress metrology information (e.g., including approximately 1,000 items for each lot), defect information accessible by a yield related engineer, operational test information, sort information (including datalog and bitmap), but the present disclosure is not limited thereto. The description of the type of data is just an example and the present disclosure is not limited thereto. In an exemplary embodiment of the present disclosure, the computing device 100 may preprocess collected data. The computing device 100 may supplement a missing value among the collected data. The computing device 100 may, for example, supplement the missing value with an intermediate value or an average value or delete a column in which a plurality of missing values exists. Furthermore, for example, the computing device 100 may use a subject matter expertise of a manager in data pre-processing by the computing device 100 for matrix completion. For example, the computing device 100 may remove, from collected data, values (e.g., values estimated as a malfunction of a sensor, etc.) which are completely out of a boundary and a limit. Furthermore, the computing device 100 may adjust a value of the data so as to allow the data to similarly have a scale while maintaining characteristics. The computing device 100 may, for example, apply column-based normalization of data. The computing device 100 may simplify processing by removing a column which is not associated with processing of the neural network model from the data. In an exemplary embodiment of the present disclosure, the computing device 100 may perform an appropriate input data pre-processing method in order to facilitate training of the neural network model for generating a classification model and active training. A description of specific examples regarding types, examples, preprocessing, conversion, etc., of input data is specifically discussed in U.S. patent application Ser. No. 10/194,920 (filed on Jul. 12, 2002), which is hereby incorporated by reference in its entirety.

In an exemplary embodiment of the present disclosure, the input data may include all kinds of data which are acquired in the industrial field as described above. For example, the data may include operating parameters of a device for producing a product in a production process of the product, sensor data acquired by an operation of the device, and the like. One input datum may include data acquired while manufacturing a product by using one manufacturing recipe in one manufacturing equipment. The data acquired while manufacturing the product may include sensor data. In other words, an input dataset including all input data may include data acquired while manufacturing the product by using one or more manufacturing recipes in one or more manufacturing equipment (in other words, since data regarding multiple manufacturing equipment and multiple manufacturing recipes may coexist, the input dataset may have a plurality of normal states), but each input data may have one normal state as the data acquired in producing the product by one manufacturing recipe in each one manufacturing equipment.

In an exemplary embodiment of the present disclosure, the manufacturing equipment may include predetermined manufacturing equipment for producing the product in the industrial field and for example, may include semiconductor manufacturing equipment, but the present disclosure is not limited thereto.

In an exemplary embodiment of the present disclosure, the manufacturing recipe may be configured by a method for producing the product in the industrial field and more specifically, the manufacturing recipe may include data for controlling the manufacturing equipment. In an exemplary embodiment of the present disclosure, the manufacturing recipe may, for example, include a semiconductor manufacturing recipe loaded to the manufacturing equipment, but the present disclosure is not limited thereto.

The memory 130 may store a computer program for performing the data processing method according to an exemplary embodiment of the present disclosure and the stored computer program may be read and driven by the processor 110.

The network unit 150 may transmit and receive data for performing the data processing method according to an exemplary embodiment of the present disclosure to and from other computing devices, manufacturing devices, servers, and the like. The network unit 150 enables communications among a plurality of computing devices to allow data processing using the neural network model to be distributed and processed.

The processor 110 may acquire a dataset including one or more data to be trained. As described above, in an exemplary embodiment of the present disclosure, the data may include predetermined kind of data acquired in the industrial field and the processor 110 may acquire data from other computing devices, manufacturing equipment, etc. One or more acquired data may constitute a dataset and the dataset may be a set of data used for computation of one epoch of training of the neural network model. The dataset may include labeled data and unlabeled data. The unlabeled data may be labeled by the data processing method according to an exemplary embodiment of the present disclosure and in the data processing method according to an exemplary embodiment of the present disclosure, the unlabeled data is labeled to increase a ratio of the labeled data included in the dataset, thereby enhancing the performance of the classification model. In other words, in an initial dataset, only some data may be labeled, but the unlabeled data may be additionally labeled by the data processing method according to an exemplary embodiment of the present disclosure.

A data subset as a subset of the dataset may include one or more data and the data subset may be configured by selecting data according to a predetermined criterion.

The processor 110 may input one or more data included in the dataset into the classification model and map each data to resolution space. The classification model as a neural network model for classifying the data may classify respective data included in the dataset according to one or more classification criteria determined by training of the neural network model using the dataset. The classification model may include, for example, a support vector machine (SVM) or the like, but the present disclosure is not limited thereto and may be configured by a predetermined neural network model having a function to classify the data. The classification model may be a model in which the classification criterion is trained by using the labeled data included in the dataset. In an exemplary embodiment of the present disclosure, the classification criterion may be a predetermined criterion for classifying the data. In an exemplary embodiment of the present disclosure, the classification criterion may be a classification criterion (e.g., positioned in the resolution space) of the classification model and may be a criterion for classifying the data in data space. In an exemplary embodiment of the present disclosure, the dataset may include the labeled data and the unlabeled data and an initial classification model may be a model trained by using initial labeled data. The initial labeled data may be data of a predetermined number randomly selected. In other words, when the processor 110 acquires a dataset including only the unlabeled data, the processor 110 may randomly select a predetermined number of data in the dataset and label the selected data. Here, labeling initially randomly selected data may be performed, for example, based on an input of a user.

When the unlabeled data in the dataset is additionally labeled, the classification model may be retrained by using additional labeling and a classification performance may be improved through retraining and the classification criterion may be changed. The processor 110 may select at least some of the unlabeled data based on a predetermined criterion and additionally label the selected unlabeled data. Labeling the unlabeled data selected based on the predetermined criterion by the processor 110 may be performed without the user input in the processor 110 or performed based on the user input.

The classification model may extract a feature from the input data and the feature may be a vector representation representing a feature of the input data. The data input into the classification model may be mapped to the resolution space in a vector form. In the present disclosure, the resolution space may include a space in which data may be mapped to a representation in which predetermined processing for the input data is performed and for example, may include a space to which the data processed by the classification model may be mapped or a space to which a dimension reduction representation or the vector representation of the input data may be mapped. In the present disclosure, a data space may include a space to which the input data may be mapped.

The processor 110 may determine an uncertainty level with respect to labeling criteria for each of one or more data included in a dataset. The uncertainty level as an uncertainty level for classification of data may include a measure for how clearly to classify the corresponding data for the classification criterion.

The uncertainty level with respect to the labeling criteria for each of the one or more data may be determined based on a result of classifying each of the one or more data using the classification model. The processor 110 may map each of the one or more data to the resolution space by inputting each of the one or more data into the classification model and determine the uncertainty level with respect to the labeling criteria based on a distance between a location of each of the one or more data in the resolution space and the classification criterion of the classification model. The processor 110 may determine the uncertainty level with respect to the labeling criteria of the corresponding data based on the distance between the location of the data in the resolution space and the classification criterion in the resolution space.

In another exemplary embodiment of the present disclosure, the uncertainty level with respect to each of the data may be determined based on the distance between the classification criterion in the data space and the location of the corresponding data. The data may itself contain certain features and may be classified as data itself. There may be a classification criterion for classifying the data itself and the uncertainty level with respect to the classification criterion may be determined based on the distance between the classification criterion of the data in the data space and the corresponding data.

Figure 4:
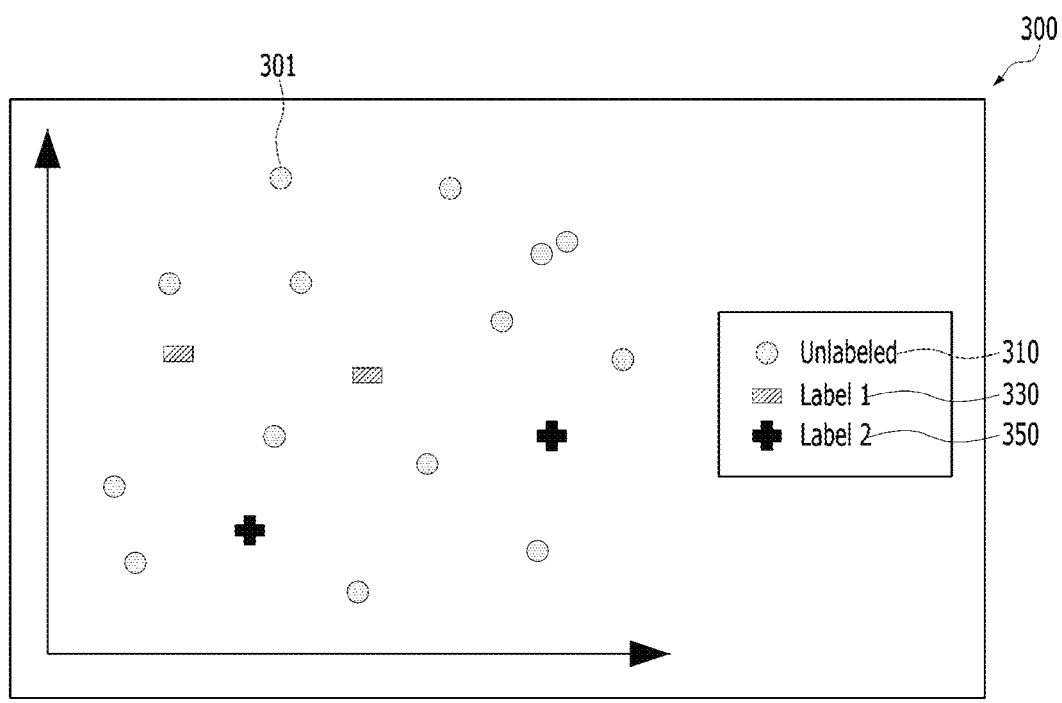
FIG. 4 is a schematic plot for describing a process of a data processing method according to an exemplary embodiment of the present disclosure.

FIG. 4 is a conceptual view of a plot illustrating that each of one or more data of the dataset is mapped to the resolution space by the classification model according to an exemplary embodiment of the present disclosure. FIG. 4 illustrates a 2-dimensional resolution space for convenience, but in an exemplary embodiment of the present disclosure, a dimension of the resolution space may be a predetermined dimension. Referring to FIG. 4, respective data 301 may be mapped to a resolution space 300, and the respective data may be labeled data 330 and 350 or unlabeled data 310.

Figure 5:
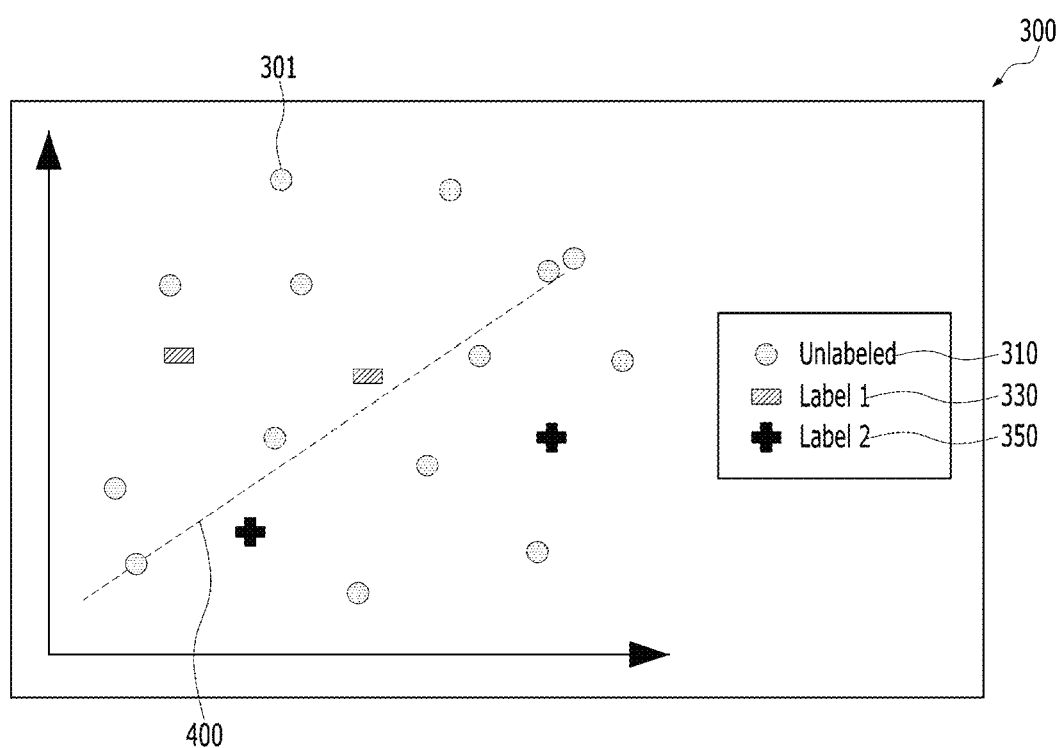
FIG. 5 is a schematic plot illustrating a process of a data processing method according to an exemplary embodiment of the present disclosure.

The processor 110 may determine the uncertainty level with respect to the labeling criteria for each data. The uncertainty level may be determined based at least in part on a result of classifying respective data included in the dataset by using the classification model. FIG. 5 is a conceptual view a plot illustrating that each of one or more data of the dataset is mapped to the resolution space by the classification model according to an exemplary embodiment of the present disclosure. FIG. 5 is a conceptual view illustrating that the classification model trained by the initial labeled data classifies data mapped to the resolution space. In FIG. 5, data to which a first label 330 is applied and data to which a second label 350 is applied based on a classification criterion 400 are classified according to the classification criterion 400 and mapped to the resolution space. The processor 110 may determine the uncertainty of the corresponding data based on the distance between the location of the data mapped to the resolution space in the resolution space and the classification criterion. The processor 110 may determine that the uncertainty of the corresponding data is higher as the distance between the location of the data in the resolution space and the classification criterion is smaller. The distance between the location of the data in the resolution space and the classification criterion may be, for example, a Euclidean distance, but the present disclosure is not limited thereto. The uncertainty level may be determined with respect to each data. Still referring to FIG. 5, it may be determined that as the data is positioned adjacent to the classification criterion 400, the uncertainty level of the corresponding data is higher. When the data having the higher uncertainty level is labeled, the classification performance of the classification model may be sophisticated, so that when the unlabeled data is selected for additional labeling, the uncertainty level of the corresponding data may be considered.

The processor 110 may determine a similarity level for one or more data included in a data subset. The data subset may be a unique pair selected from one or more data included in the dataset. For example, the data subset may include two or more data selected from the unlabeled data included in the dataset. Respective data subsets may be different from each other. For example, when there are five data, the data subset may be a subset having two or more data selected from five data and the respective subsets may not overlap with each other. The processor 110 may determine the similarity level of the data included in the data subset based on the location of the data included in the data subset in the resolution space. The processor 110 may input each of the data included in the data subset into the classification model and map each input data to the resolution space and determine the similarity level of the data included in the data subset based on the location of each data in the resolution space. The distance of each data in the resolution space may be determined based on the Euclidean distance, but the present disclosure is not limited thereto. A similarity of the data may be determined based on the distance in the resolution space, a cosine similarity, an inner product, and the like, but the present disclosure is not limited thereto and the processor 110 may determine the similarity level of the data included in the data subset based on a predetermined data similarity determination algorithm.

In another exemplary embodiment of the present disclosure, the similarity level of one or more data included in the data subset may be determined based on the distance between respective data in the data space. The processor 110 may map each of the one or more data included in the data subset to the data space and determine the similarity level of the data based on the location of each data in the data space. In other words, the similarity level may be determined based on characteristics of the data itself regardless of the classification model.

Figure 6:
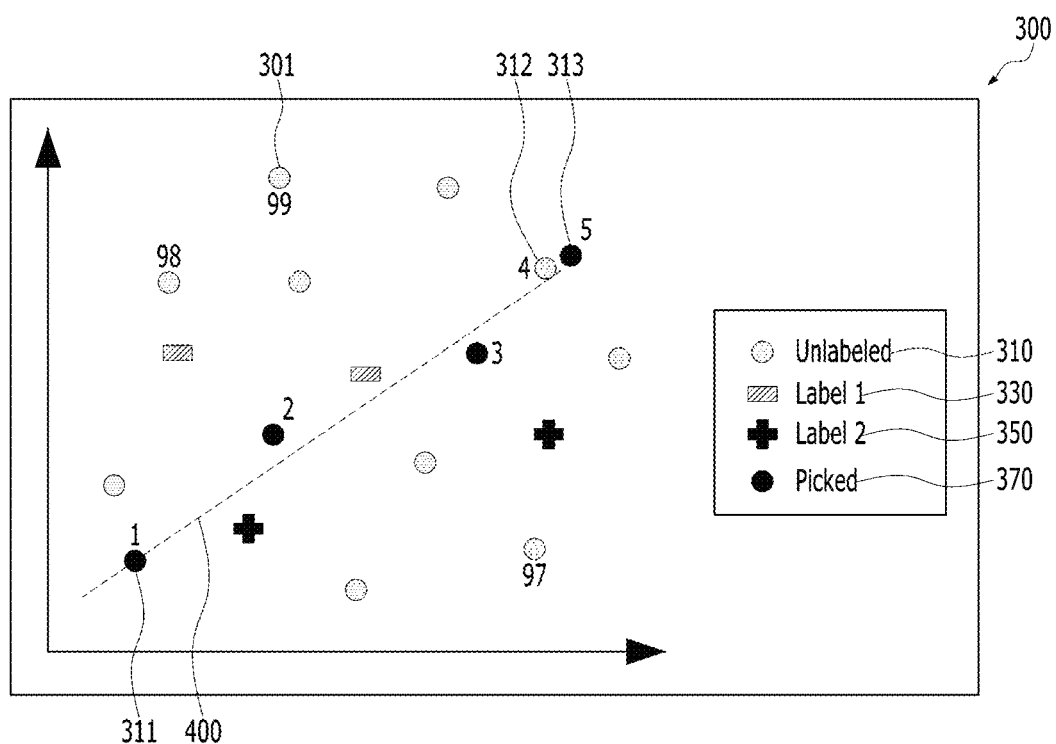
FIG. 6 is a schematic plot illustrating a process of a data processing method according to an exemplary embodiment of the present disclosure.

FIG. 6 is a conceptual view of a plot illustrating that each of one or more data of the dataset is mapped to the resolution space by the classification model according to an exemplary embodiment of the present disclosure. In FIG. 6, it may be verified that some of the data mapped to the resolution space are selected for labeling. In FIG. 6, it may be verified that among data #1 to #5, data #1 311, data #2, data #3, and data #5 313 may be selected for labeling, but data #4 312 is not selected for labeling. Data #4 312 is adjacent to data #5 313 in the resolution space, and as a result, the similarity level between data #4 312 and data #5 313 may be high. The processor 110 may determine the similarity level of the data subset including data #4 312 and data #5 313. In this case, the processor 110 may determine that the similarity level of data #4 312 and data #5 313 is high and when the similarity level is equal to or higher than a predetermined criterion, the processor 110 may not select the data subset including data #4 312 and data #5 313 with respect to additional labeling. The predetermined criterion for the similarity level may be determined based on characteristics of data to be labeled or determined based on the number of data included in the dataset, the number of labeled data included in the dataset, the number of unlabeled data included in the dataset, a ratio between the number of labeled data and the number of unlabeled data of the dataset, the number of data to be labeled, etc.

When data having a low similarity level is labeled, the additional labeling may be minimized, thereby reducing labeling cost.

As described above, the uncertainty level and the similarity level may be determined by extracting the feature by inputting data into the classification model and determined based on mapping locations of data in the data space without processing such as feature extraction for the data.

In an exemplary embodiment of the present disclosure, the processor 110 may perform a data processing method according to an exemplary embodiment of the present disclosure in order to find optimum values of the uncertainty level and the similarity level in order to select the unlabeled data to be additionally labeled.

The processor 110 may select at least some of data included in the dataset based on the uncertainty level and the similarity level and additionally label the selected data. The processor 110 may select at least some of the unlabeled data among the data included in the dataset based on the uncertainty level and the similarity level and additionally label the selected data. When the processor 110 labels the unlabeled data, the processor 110 may select the unlabeled data which may allow the performance of the classification model to be most improved. The processor 110 may select data to be additionally labeled based on an importance of the unlabeled data itself and a relationship between the unlabeled data.

The processor 110 may determine the uncertainty level with respect to each data included in the dataset and determine the similarity level of the data included in the data subset with respect to each data subset. The processor 110 may select the unlabeled data to be additionally labeled based on the uncertainty level determined for each data and the similarity level determined for each data subset.

The processor 110 may select and label data in having a high uncertainty level and a low similarity level. The processor 110 may label data in which the uncertainty level is high among unlabeled data. Furthermore, the processor 110 may label the data having the low similarity level among the unlabeled data. When the processor 110 labels the unlabeled data, the processor 110 may select the unlabeled data which may allow the performance of the classification model to be most improved. The data having the high uncertainty level as data adjacent to the classification criterion 400 of the classification model may be data of which classification is not accurate in a current classification model. Accordingly, when the data having the high uncertainty level is labeled, the performance of the classification model may be significantly improved. Since the data having the high similarity may show a similar effect to labeling all data having a substantially high similarity in spite of labeling only one of the data having the high similarity, the processor 110 may selectively label only a data subset having a low similarity for efficiency.

The processor 110 may correlate the uncertainty level and the similarity level with each other and reflect the correlated uncertainty level and similarity level to data selection. The processor 110 may compute a relative weight for the uncertainty level and the similarity level and correlate the uncertainty level and the similarity level with each other and reflect the correlated uncertainty level and similarity level to the data selection. For example, the processor 110 may multiply the uncertainty level by a weight c (here, for example, c is a value between 0 and e) and multiply the similarity level by a weight d to add the weights to the uncertainty level and the similarity level and reflect the weights to the data selection. Here, the weights added to the uncertainty level and the similarity level may have a correlation. For example, as d=e−c, the processor 110 may correlate the uncertainty level and the similarity level with each other and reflect the correlated uncertainty level and similarity level to the data selection. The aforementioned correlation coefficient is just an example and the present disclosure is not limited thereto.

The processor 110 may update a classification model based at least in part on the additionally labeled data. Since the unlabeled data is additionally labeled, the processor 110 may update the classification model by training the classification model by using the dataset including the additionally labeled data. The classification model is retrained by using a dataset including more labeled data to enhance the performance of the classification model.

Hereinafter, a detailed process of selecting data to be additionally labeled will be described by using an equation.

f(D) represents a model trained by using dataset D. The dataset D may be constituted by (x', y', x) and here, x' means data labeled with y' and x represents the unlabeled data. Dataset D' means a dataset of which some of unlabeled data x are additionally labeled.

h(f) may represent an index indicating the performance of model f.

R(X) may represent a level of performance enhancement of model f when the unlabeled data x is labeled.

$$(R(X)=h(f(D'))-h(f(D)))$$ [EQUATION 1]

In an exemplary embodiment of the present disclosure, the processor 110 may select and label data in which R(X) is the maximum among the unlabeled data.

z may be a variable having a value of 0 or 1 in order to indicate what data is selected to be labeled among the unlabeled data x.

In other words, when i-th unlabeled data $x_i$ is selected for labeling, $z_i=1$ and when $x_i$ is not selected for labeling, $z_i=0$.

z may be configured to have a predetermined value for efficiency of computation and may be mapped to a close value of 0 and 1 at the time of the data selection. An exemplary embodiment in which the z value is 0 and 1 is just an example and the present disclosure is not limited thereto.

Equation 1 which embodies contents of the invention by using z is as follows.

$$R(z) = \sum_{i=1}^{n} \varphi_i(z_i) + \sum_{i=1}^{n} \sum_{j=i+a}^{n} \varphi_{ij}(z_i, z_j)$$ [EQUATION 2]

Here, n may represent the number of unlabeled data or the number of candidates of unlabeled data to be selected.

Here, a may represent a predetermined real number and i and j represent indicators for distinguishing the unlabeled data. For example, a=1. In other words, a may represent a real number for selecting different unlabeled data.

Here, $\varphi_i(z_i)=z \times U(x_i)$ and $U(x_i)$ may represent the uncertainty level of $x_i$ and $U(x_i)$ may represent a function normalized to have a value between 0 and b and for example, the value of b may be 1.

Here, $\varphi_{ij}(z_i,z_j)=b-z_i z_j S(x_i,x_j)$ and $S(x_i,x_j)$ may represent the similarity level between $x_i$ and $x_j$ and may represent a function normalized to have the value between 0 and b and for example, the value of b may be 1. For convenience, it is laid out that the similarity level of two unlabeled data is acquired in the equation, but the present disclosure is not limited thereto and the processor 110 may determine the similarity level among a plurality of data.

Accordingly, the processor 110 may determine the uncertainty level with respect to each unlabeled data and determine the similarity level with respect to each data subset including a plurality of unlabeled data, and select unlabeled data to maximize the performance enhancement of the classification model when the unlabeled data is additionally labeled.

The processor 110 acquires $z_1, z_2, \ldots, z_n$ to maximize a value of R(z) to select the acquired $z_1, z_2, \ldots, z_n$ in order to additionally label the corresponding unlabeled data. As described above, respective $z_1, z_2, \ldots, z_n$ may be vector representations representing i-th data included in the dataset. In other words, when the unlabeled data is selected for labeling, $z_1, z_2, \ldots, z_n$ to maximize the value of R(z) may be acquired and the unlabeled data may be selected based on the acquired $z_1, z_2, \ldots, z_n$.

The processor 110 may acquire $z_1, z_2, \ldots, z_n$ to maximize the value of R(z) under a constraint (e.g., a condition in which the number of data to be selected is within a specific range) in which the sum of $z_1, z_2, \ldots, z_n$ is within a specific range and select the acquired $z_1, z_2, \ldots, z_n$ in order to additionally label the corresponding unlabeled data. Here, the specific range may be one value. A case of selecting $z_1$, $z_2, \ldots, z_n$ in order to label all of $z_1, z_2, \ldots, z_n$ may maximize the value of R(z), but this is inefficient, so that the number of data to be selected to select only some of the unlabeled data may be at least a part of the number of unlabeled data. Accordingly, the processor 110 may select data to maximize performance improvement of the classification model in a situation in which the number of data to be selected is limited according to an exemplary embodiment of the present disclosure.

The processor 110 may acquire $z_1, z_2, \ldots, z_n$ to maximize the value of R(z) under a constraint (i.e., a condition in which the number of data to be selected is within a specific range or is selected among specific values) in which a function value defined for $z_1, z_2, \ldots, z_n$ has one value within a specific range or among predetermined values and select the acquired $z_1, z_2, \ldots, z_n$ in order to additionally label the corresponding unlabeled data. Here, the function may be operations such as four fundamental arithmetic operations such as addition, subtraction, multiplication, division, operations such as logarithm, exponent, trigonometric functions (sine, cosine, tangent, etc.), etc., and a combination of the operations. The present disclosure is not limited thereto and the processor 110 may use various mathematical operations.

The processor 110 may correlate the uncertainty level and the similarity level with each other and reflect the correlated uncertainty level and similarity level to the data selection. The processor 110 may compute a relative weight for the uncertainty level and the similarity level and correlate the uncertainty level and the similarity level with each other and reflect the correlated uncertainty level and similarity level to the data selection. Such a process is expressed by Equation 3 as below.

$$R(z) = c\sum_{i=1} \varphi_i(z_i) + d\sum_{i=1}\sum_{j=i+a} \varphi_{ij}(z_i, z_j) \quad [\text{EQUATION 3}]$$

Here, c and d may have the correlation and for example, d=(e−c). c and d may be values between 0 and e and for example, e may be 1.

The processor 110 adjusts the correlation coefficient to determine a reflection ratio of the uncertainty level and the similarity level when selecting data to be additionally labeled. The processor 110 adjusts the correlation coefficient based on a ratio of labeled data and unlabeled data of the dataset to determine the reflection ratio of the uncertainty level and the similarity level when selecting the data to be additionally labeled.

For example, the processor 110 may initially adjust the correlation coefficient so as to reflect the uncertainty level and the similarity level at a similar ratio. Furthermore, for example, the processor 110 may prevent similar data from being unnecessarily labeled by reflecting the similarity level more largely than the uncertainty level as the ratio of the labeled data increases. Furthermore, for example, the processor 110 may select optimized additional labeled data in a situation in which there is not much remaining data having the high uncertainty level by reflecting the uncertainty level more largely than the similarity level as the ratio of the labeled data increases.

In an exemplary embodiment of the present disclosure, when the neural network model actively trains data while labeling the data, additional data is selected based on the uncertainty level of the unlabeled data to additionally label data which is difficult for the classification model to classify, thereby enhancing the performance of the classification model. Furthermore, in an exemplary embodiment of the present disclosure, when the data is additionally labeled, the performance of the model may be enhanced while minimizing additional labeling by selecting the data to be additionally labeled based on data having a low similarity level to each other. In an exemplary embodiment of the present disclosure, both the uncertainty level and the similarity level are considered in order to select the data to be additionally labeled to optimize an additional labeling operation for enhancing the performance of the model. Furthermore, an additional labeling target data selection process is performed for all unlabeled data to select data considering only the uncertainty level and then select additional labeling target data which is more optimized than a case of filtering based on the similarity level.

Figure 2:
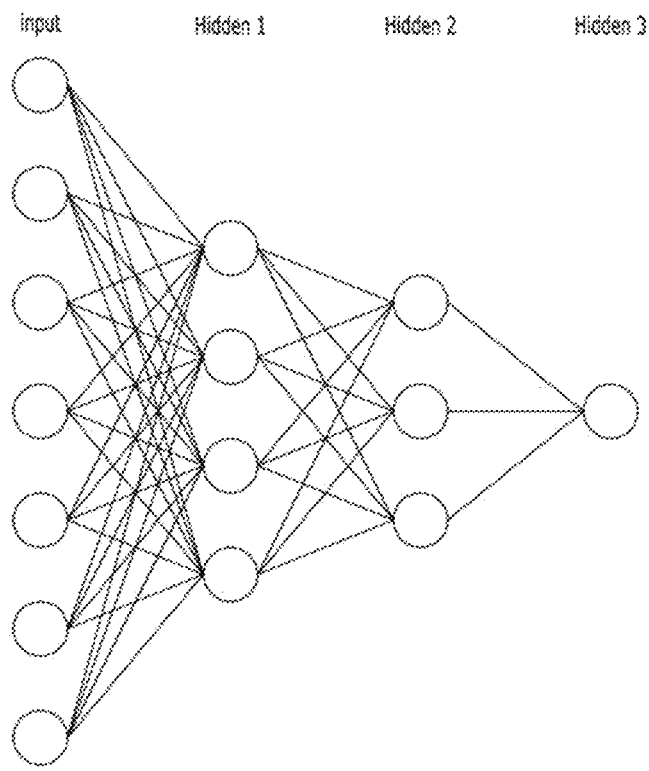
FIG. 2 is a schematic view illustrating a network function according to an exemplary embodiment of the present disclosure.

FIG. 2 is a schematic view illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called a "node". The "nodes" may also be called "neurons". The neural network is configured to include one or more nodes. The nodes (alternatively, neurons) constituting the neural networks may be connected to each other by one or more "links".

In the neural network, one or more nodes connected through the link may relatively form the relationship between an input node and an output node. Concepts of the input node and the output node are relative, and a predetermined node which has the output node relationship with respect to one node may have an input node relationship in terms of the relationship with another node and vice versa. As described above, the relationship of the input node to the output node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the it may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links in the neural network. For example, when the same number of nodes and links exist and two neural networks in which the weight values of the links are different from each other exist, it may be recognized that two neural networks are different from each other.

The neural network may be configured to include one or more nodes. Some of the nodes constituting the neural network may constitute one layer based on distances from an initial input node. For example, an aggregation of nodes of which the distance from the initial input node is n may constitute an n layer. The distance from the initial input node may be defined by the minimum number of links needed to be passed for reaching the corresponding node from the initial input node. However, the definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Furthermore, a hidden node may not mean the initial input node and the final output node but the nodes constituting the neural network. In the neural network according to an exemplary embodiment of the present disclosure, the number of nodes of the input layer may be the same as the number of nodes of the output layer, and the neural network may be a neural network of a type in which the number of nodes decreases and then, increases again as the layer progresses from the input layer to the hidden layer. Furthermore, in the neural network according to another exemplary embodiment of the present disclosure, the number of nodes of the input layer may be smaller than the number of nodes of the output layer, and the neural network may be a neural network of a type in which the number of nodes decreases as the layer progresses from the input layer to the hidden layer. Furthermore, in the neural network according to yet another exemplary embodiment of the present disclosure, the number of nodes of the input layer may be larger than the number of nodes of the output layer, and the neural network may be a neural network of a type in which the number of nodes increases as the layer progresses from the input layer to the hidden layer. The neural network according to yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, potential structures of photos, text, video, voice, and music (e.g., what objects are in the picture, what the content and feelings of the text are, what the content and feelings of the voice are) may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The disclosure of the deep neural network described above is merely an example and the present disclosure is not limited thereto.

In an exemplary embodiment of the present disclosure, the neural network model may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrically to reduction to the output layer (symmetrical to the input layer) in the bottleneck layer. In this case, nodes of a dimension reduction layer and a dimension reconstruction layer may be symmetric to each other or not symmetric to each other. The auto encoder may perform non-linear dimensional reduction. The number of input and output layers may correspond to the number of sensors remaining after preprocessing the input data. The auto encoder structure may have a structure in which the number of nodes in the hidden layer included in the encoder decreases as the distance from the input layer increases. When the number of nodes in the bottleneck layer (a layer having a smallest number of nodes between an encoder and a decoder) is too small, a sufficient amount of information may not be delivered, and as a result, the number of nodes in the bottleneck layer may be maintained to be a specific number or more (e.g., half of the input layers or more).

The neural network may be trained in at least one scheme of supervised training, unsupervised training, and semi supervised training. Training of the neural network is to minimize errors in output. The training of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised training, the training data labeled with a correct answer is used for each training data (i.e., the labeled training data) and in the case of the unsupervised training, the correct answer may not be labeled in each training data. That is, for example, the training data in the case of the supervised training related to the data classification may be data in which category is labeled in each training data. The labeled training data is input to the neural network, and the error may be calculated by comparing the output (category) of the neural network with the label of the training data. As another example, in the case of the unsupervised training related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a training rate. Calculation of the neural network for the input data and the back-propagation of the error may constitute a training cycle (epoch). The training rate may be applied differently according to the number of repetition times of the training cycle of the neural network. For example, in an initial stage of the training of the neural network, the neural network ensures a certain level of performance quickly by using a high training rate, thereby increasing efficiency and a low training rate is used in a latter stage of the training, thereby increasing accuracy.

In training of the neural network, the training data may be a subset of actual data (i.e., data to be processed using the trained neural network) of actual data, and as a result, there may be a training cycle in which errors for the training data decrease, but the errors for the actual data increase. Overfitting is a phenomenon in which the errors for the actual data increase due to excessive training of the training data. For example, a phenomenon in which a neural network that trains a cat by showing a yellow cat views cats other than the yellow cat and does not recognize that the cats other than the yellow cat are the cat may be a kind of overfitting. The overfitting may act as a cause which increases the error of the machine training algorithm. Various optimization methods may be used in order to prevent the overfitting. In order to prevent the overfitting, a method such as increasing the training data, regularization, dropout of omitting a part of the node of the network in the process of training, etc., may be applied.

Figure 3:
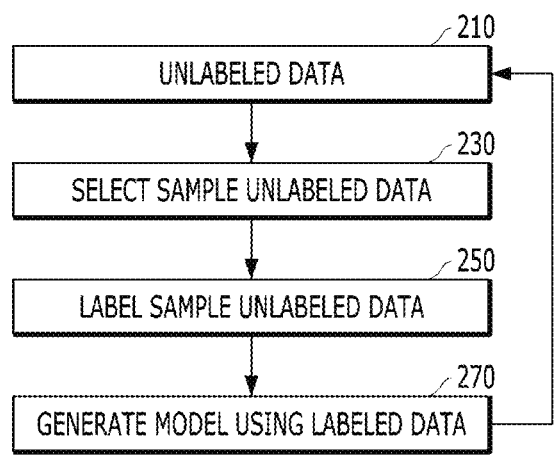
FIG. 3 is a flowchart showing data processing of a data processing method according to an exemplary embodiment of the present disclosure.

FIG. 3 is a flowchart showing data processing of a data processing method according to an exemplary embodiment of the present disclosure.

Hereinafter, a data processing process of the data processing method will be described with reference to conceptual views of FIGS. 4 to 7 together.

A computing device 100 may acquire a dataset (210). The dataset may include unlabeled data and labeled data. The computing device 100 may train an initial classification model based on some labeled data included in the dataset. An example illustrated in FIG. 4 is a conceptual view illustrating a state in which data included in the dataset is mapped to the resolution space by using the initial classification model and some predetermined data among the data is labeled. The computing device 100 may map the data included in the dataset to the resolution space by using the initial classification model. Here, the initial classification model may be a neural network model having a predetermined weight and a classification model trained based on previous training data. In the example illustrated in FIG. 4, each point represents the data mapped to the resolution space. For example, reference numeral 301 represents that the unlabeled data is mapped to the resolution space. The computing device 100 may select and label some of the data included in the dataset. As described above, the labeling may be performed by the computing device 100 or performed based on a user input. In the example illustrated in FIG. 4, a state is illustrated in which unlabeled data 310, data to which a first label 330 is applied, and data to which a second label 350 is applied are mapped to the resolution space.

FIG. 5 is a conceptual view illustrating that the classification model trained by the initial labeled data classifies data mapped to the resolution space. In the example illustrated in FIG. 5, it may be verified that the data to which the first label 330 is applied and the data to which the second label 350 is applied are classified in the resolution space by the classification criterion 400.

Some of unlabeled data 210 included in the dataset may be selected for labeling based on the data processing method according to an exemplary embodiment of the present disclosure (230). The computing device 100 may select sample unlabeled data to be labeled based on the uncertainty level and the similarity level of the unlabeled data as described above.

FIG. 6 is a conceptual view of a plot illustrating that each of one or more data of the dataset is mapped to the resolution space by the classification model according to an exemplary embodiment of the present disclosure. In FIG. 6, it may be verified that some of the data mapped to the resolution space are selected for labeling.

In FIG. 6, it may be verified that among data #1 to #5, data #1 311, data #2, data #3, and data #5 313 may be selected for labeling, but data #4 312 is not selected for labeling. It may be verified that data #1 to #5 are data which are positioned adjacent to the classification criterion 400 and have the high uncertainty level and data #4 among the data has a high similarity level to data #5 and the corresponding data is not thus selected. Furthermore, in the example of FIG. 6, it may be verified that data #97, #98, and #99 have the low uncertainty level and the corresponding data is not thus selected.

In other words, the computing device 100 may select labeling target data 370 among the unlabeled data 310 based on Equation 2 or 3 described above.

The computing device 100 may select a sample to maximize the performance improvement of the classification model upon selection based on the uncertainty level for each unlabeled data and the similarity level between data included in a data subset including a plurality of unlabeled data. It is preferable to select the unlabeled data 310 having the high uncertainty level and the low similarity level in order to maximize the performance improvement of the classification model.

The computing device 100 may label the selected sample (250). As described above, the labeling may be performed by using the classification model in the computing device 100 or performed based on the user input.

Figure 7:
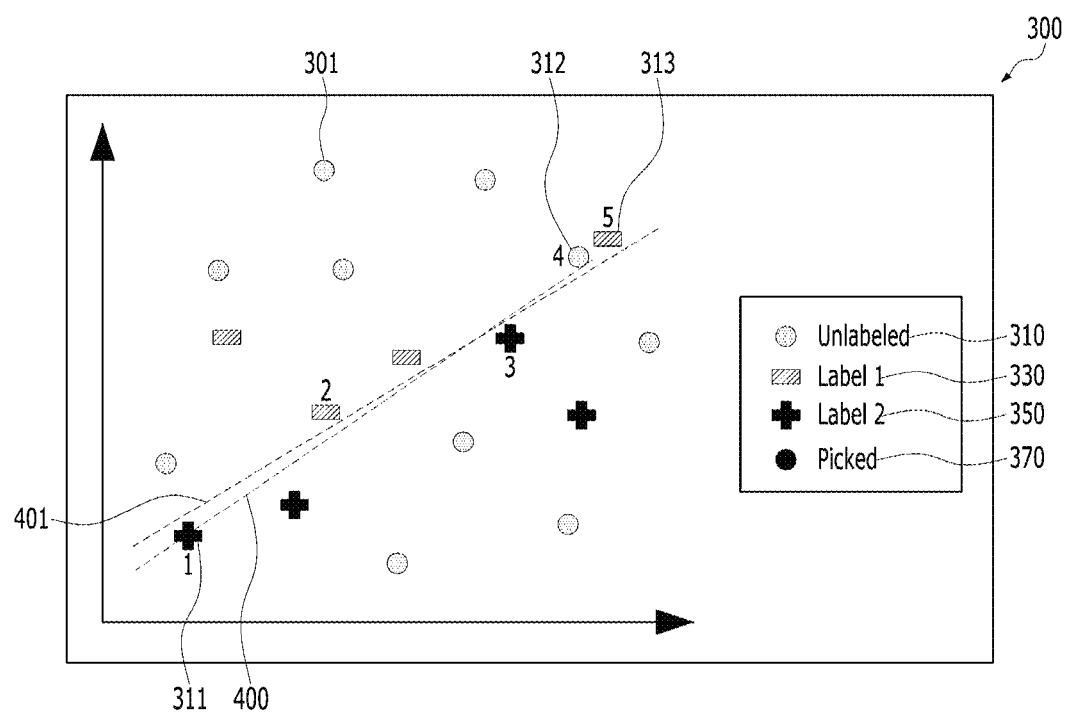
FIG. 7 is a schematic plot illustrating a process of a data processing method according to an exemplary embodiment of the present disclosure.

FIG. 7 is a conceptual view illustrating that the selected unlabeled data is labeled and the classification model is updated by using a dataset including additionally labeled data. The computing device 100 may label selected first data 311, second data, third data, and fifth data 313. In the example of FIG. 7, the second label is applied to the first data 311, the first label is applied to the second data, the second label is applied to the third data, and the first label is applied to the fifth data.

Since the labeled data is added, the computing device 100 may train the classification model by using the dataset to which the labeled data is added (270). It may be verified in the example of FIG. 7 that the classification criterion 400 of the classification model is adjusted as shown in reference numeral 401 as a training result. The classification criterion of the classification model may be more sophisticated while the labeled data is added and classification performance may be enhanced.

When the model is generated by using the dataset, a labeling quality of the dataset and the performance of the model may have the correlation. A specialist in the field may be required for labeling and time and cost may be consumed. Accordingly, when labeling is efficient, time and cost for managing the dataset for generating the model may be saved. Therefore, by the data processing method according to an exemplary embodiment of the present disclosure, some data which is high in efficiency while most enhancing the performance of the model among the unlabeled data is selected and labeled to significantly reduce cost for labeling. In other words, it is preferable to minimize data which needs to be labeled in order to reduce labeling cost and it may be important to efficiently select the data which needs to be labeled in order to maintain or enhance the performance of the model while minimizing the labeled data. Accordingly, the data processing method according to an exemplary embodiment of the present disclosure enhances the classification performance of the model by considering the uncertainty level and the similarity level of the unlabeled data and prevents a duplicated labeling task, thereby achieving efficiency.

A computer program and a method for data processing according to an exemplary embodiment of the present disclosure may be implemented by the following modules.

In an exemplary embodiment of the present disclosure, the computer program or method for data processing may be implemented by a module for determining an uncertainty level with respect to labeling criteria for each of one or more data included in a dataset; a module for determining a similarity level for one or more data included in a data subset; and a module for selecting at least some of data included in the dataset based on the uncertainty level and the similarity level, and additionally labeling the selected data.

Alternatively, the computer program or method for data processing may be implemented by a module for mapping one or more data included in the dataset to a solution space by inputting the one or more data included in the dataset to a classification model.

Alternatively, the computer program or method for data processing may be implemented by a module for updating a classification model based at least in part on the additionally labeled data.

Alternatively, the module for selecting at least some of data included in the dataset based on the uncertainty level and the similarity level and additionally labeling the selected data may include a module for selectively labeling data having a high uncertainty level and a low similarity level.

Alternatively, the module for selecting at least some of data included in the dataset based on the uncertainty level and the similarity level and additionally labeling the selected data may include a module for selecting at least some of data included in the dataset based on the uncertainty level and the similarity level that have a correlation with one another.

According to an exemplary embodiment of the present disclosure, the data processing method and the computer program may be implemented by the module and a means, a circuit, or a logic for implementing the module.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, components, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 8:
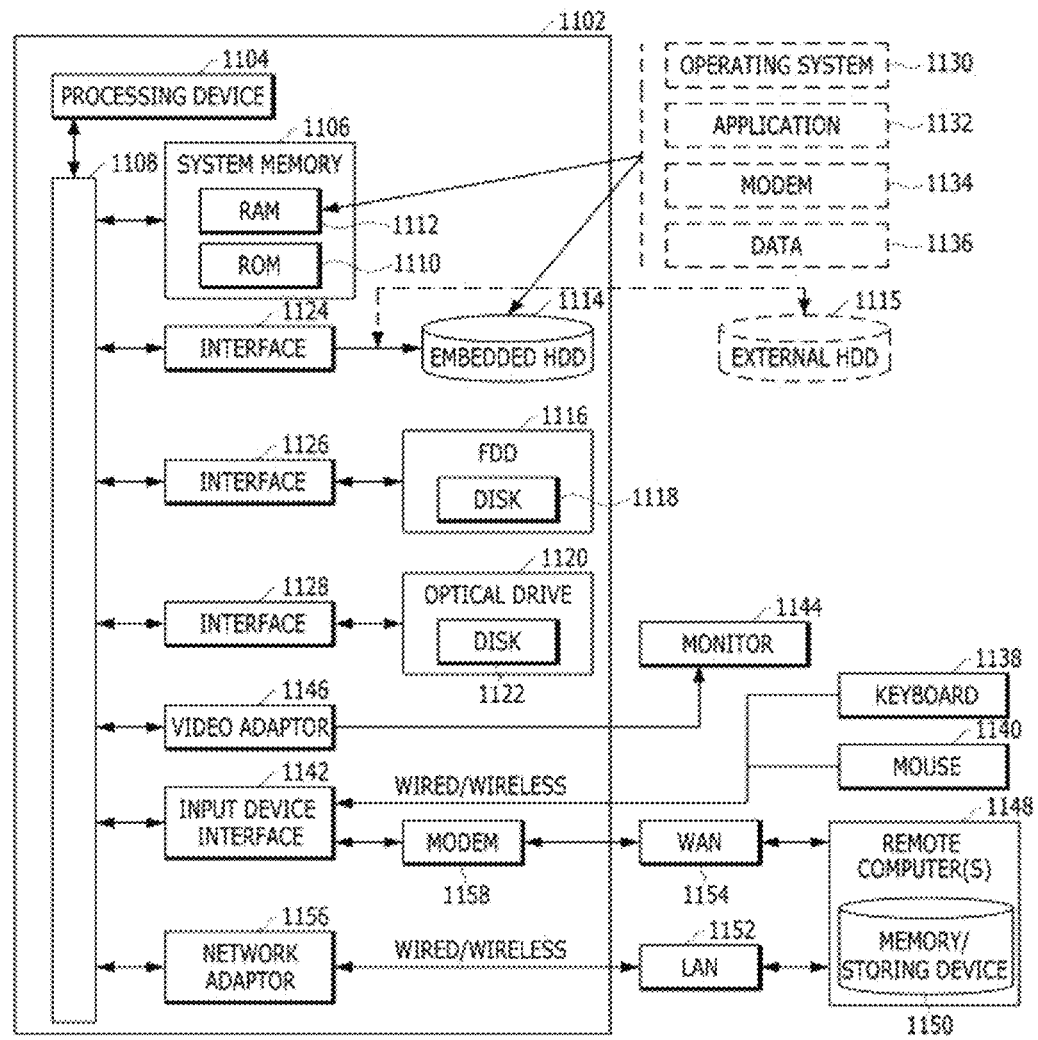
FIG. 8 is a simple and general schematic view of an exemplary computing environment in which exemplary embodiments of the present disclosure may be implemented.

FIG. 8 is a schematic view of an exemplary computing environment in which exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Furthermore, it will be well appreciated by those skilled in the art that the method of the present disclosure may be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and Furthermore, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or in a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Furthermore, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is consistent with the principles and new features presented herein.

What is claimed is:

1. A non-transitory computer readable medium storing a computer program, wherein when the computer program is executed by one or more processors of a computing device, the computer program performs operations for processing data and training a neural network classification model, and the operations comprise:
representing, in at least a two-dimensional vector solution space, one or more data in a dataset each as a vector corresponding to a feature of an article;
determining an uncertainty level for each of the one or more data included in the dataset, wherein the uncertainty level is associated with a distance in the solution space from a classification criteria to the each of the one or more data in the dataset;
determining a similarity level for one or more data included in a data subset, wherein the similarity level is associated with a distance in the solution space between respective ones of the one or more data in the data subset,
wherein one or both of determining the uncertainty level and determining the similarity level are based on determining a location, in the solution space, of the one or more data included in the respective one of the dataset and the data subset;
selecting at least some of data included in the dataset based on a calculation that correlates the uncertainty level and the similarity level by summing relative weights of the uncertainty level and the similarity level; and
labeling the selected data and training the neural network classification model using the selected data.

2. The non-transitory computer readable medium according to claim 1, wherein the operations further comprise:
mapping the one or more data included in the dataset to the solution space by inputting the one or more data included in the dataset to +the neural network classification model.

3. The non-transitory computer readable medium according to claim 1, wherein the operations further comprise:
after selecting the at least some of data included in the dataset based on the uncertainty level and the similarity level and labeling the selected data,
updating the neural network classification model based at least in part on the labeled data.

4. The non-transitory computer readable medium according to claim 1, wherein selecting the at least some of data and labeling the selected data comprises:
selectively labeling data having a high uncertainty level and a low similarity level.

5. The non-transitory computer readable medium according to claim 1, wherein determining the uncertainty level comprises determining based at least in part on a result of classifying each of the one or more data using the neural network classification model.

6. The non-transitory computer readable medium according to claim 5, wherein the operations further comprise:
mapping each of the one or more data to the solution space by inputting each of the one or more data to the classification model, and
wherein determining the uncertainty level comprises determining based on a distance between a location in the solution space of each of the one or more data and classification criteria of the classification model.

7. The non-transitory computer readable medium according to claim 1, wherein the operations further comprise:
mapping each of the one or more data to a data space, and
wherein determining the uncertainty level comprises determining based on a distance between a location in a data space of each of the one or more data and the classification criteria.

8. The non-transitory computer readable medium according to claim 1, wherein the operations further comprise:
mapping each of the one or more data included in the data subset to the solution space by inputting each of the one or more data included in the data subset to the neural network classification model, and wherein determining the similarity level comprises determining based on a location in the solution space of each of the one or more data included in the data subset.

9. The non-transitory computer readable medium according to claim 1, wherein the operations further comprise:
mapping each of the one or more data included in the data subset to a data space, and
wherein determining the similarity level comprises determining based on a location in the data space of each of the one or more data included in the data subset.

10. The non-transitory computer readable medium according to claim 1, wherein the data subset comprises a unique pair selected from the one or more data included in the dataset.

11. The non-transitory computer readable medium according to claim 1, wherein the data includes sensor data collected during manufacturing of the article in a manufacturing environment.

12. A method of processing data and training a neural network classification model executed on one or more processors of a computing device, the method comprising:
representing in at least a two-dimensional vector solution space, one or more data in a dataset each as a vector corresponding to a feature of an article;
determining an uncertainty level for each of the one or more data included in the dataset, wherein the uncertainty level is associated with a distance in the solution space from a classification criteria to the each of the one or more data in the dataset;
determining a similarity level for one or more data included in a data subset, wherein the similarity level is associated with a distance in the solution space between respective ones of the one or more data in the data subset,
wherein one or both of determining the uncertainty level and determining the similarity level are based on determining a location, in the solution space, of the one or more data included in the respective one of the dataset and the data subset;
selecting at least some of data included in the dataset based on a calculation that correlates the uncertainty level and the similarity level by summing relative weights of the uncertainty level and the similarity level; and
labeling the selected data and training the neural network classification model using the selected data.

13. A computing device for processing data and training a neural network classification model, comprising:
one or more processors; and
a memory for storing computer programs executable on the one or more processors, wherein the one or more processors are configured to:
represent in at least a two-dimensional vector solution space, one or more data in a dataset each as a vector corresponding to a feature of an article;
determine an uncertainty level for each of the one or more data included in the dataset, wherein the uncertainty level is associated with a distance in the solution space from a classification criteria to the each of the one or more data in the dataset;
determine a similarity level for one or more data included in a data subset, wherein the similarity level is associated with a distance in the solution space between respective ones of the one or more data in the data subset,
wherein one or both of determining the uncertainty level and determining the similarity level are based on determining a location, in the solution space, of the one or more data included in the respective one of the dataset and the data subset;
select at least some of data included in the dataset based on a calculation that correlates the uncertainty level and the similarity level by summing relative weights of the uncertainty level and the similarity level; and
label the selected data and train the neural network classification model using the selected data.

* * * * *